United States Patent Office 3,243,464
Patented Mar. 29, 1966

3,243,464
PROCESS OF PREPARING AND PURIFYING OCTOCHLORODIHYDROXYDIPHENYL
Ludovic Parvi, Pont-de-Claix, Isere, France, assignor to Societe d'Electro-Chimie, d'Electro-Metallurgie et des Acieres Electriques d'Ugine, Paris, France, a corporation of France
No Drawing. Filed Feb. 13, 1962, Ser. No. 172,846
Claims priority, application France, Feb. 17, 1961, 853,033
3 Claims. (Cl. 260—620)

The present invention relates to an improved process for preparing octochlorodihydroxydiphenyl in the state of great purity, by alkaline hydrolysis of decachlorodiphenyl.

It is already known to prepare octochlorodihydroxydiphenyl by action of soda solutions and other alkaline bases on decachlorodiphenyl.

To carry out this reaction, several modes of operation have been recommended, which use an organic solvent capable of dissolving both the decachlorodiphenyl and the alkaline base.

In most industrial processes, the solvent is methyl alcohol. The reaction ocurring between 140 and 150° C., the reaction is carried out in an autoclave under the pressure of 10 to 17 kg./cm.$^2$.

It has also been taught to work in the presence of tertiary aliphatic alcohols, in particular teritary butyl alcohol. One works in an autoclave at 135° C. under a pressure of 5 kg./cm.$^2$.

Ethylene glycol has also been proposed; it presents the advantage of permitting a phenolization at atmospheric pressure, owing to its high boiling point: 197° C.

In order that these processes can be worked economically, it is necessary to recover the solvent. This recovery constitutes an additional step of the manufacture; it is accompanied by a loss of solvent, on account of the secondary reactions which are particularly important in the case of heavy alcohols such as ethylene glycol which are relatively costly.

The recovery of the solvent and the mediocre yield of this operation increase considerably the net cost.

Literature describes in another connection processes of phenolization of aromatic halogenated derivatives, such as $C_6Cl_6$, $C_6H_2Cl_4$, $C_6H_3Cl_3$, $C_6H_4Cl_2$, wherein one works in the absence of any organic solvents. The reactive medium is water in the presence or not of a wetting agent.

The applying of this technique to the phenolization of decachlorodiphenyl, with a view to preparing octochlorodihydroxydiphenyl, is one of the objects of the invention.

Moreover, all the known processes lead to phenol whose purity is variable, but insufficient for some applications.

The impurities of organic nature give as a matter of fact to diphenyl a grey-maroon coloration, most inconvenient when it is utilized for epoxy resins, polyesters and polycarbonates.

The second object of the invention is a purification process leading to a diphenol of great purity.

The invention relates then to:

(1) A process for preparing octochlorodihydroxydiphenyl, which consists in hydrolyzing with aqueous solutions of alkali metal or alkaline-earth metal hydroxides, in the absence of organic solvents, powered decachlorodiphenyl, at temperatures above 200° C., under autogenous pressure; then in precipitating the octochlorodihydroxydiphenyl formed, by acidification of the reaction mixture.

(2) A process for purifying octochlorodihydroxydiphenyl, which consists in treating its alkaline aqueous solution with a salt of heavy metal or alkaline-earth metal, then in separating the metal hydroxide formed and in precipitating in the clear liquid, by acidification, the purified octochlorodihydroxydiphenyl which is finally drained, washed and dried.

A. PREPARATION

The transformation of decachlorodiphenyl into octochlorodihydroxydiphenyl requires theoretically four equivalents of base per molecule of decachlorodiphenyl.

This base is generally sodium hydroxide, but potassium hydroxide, lithium hydroxide, calcium hydroxide and barium hydroxide are also suitable.

The principal product of the reaction is always diphenol, whether an excess or a deficiency of sodium hydroxide in relation to the stoichiometry is utilized. It is however advisable to work with an excess of sodium hydroxide, 4.2 to 5 moles per mole of decachlorodiphenyl, for two reasons:

With suitable conditions of operation, the conversion can be practically quantative; one avoids thus the necessity to separate from the product of the reaction the non-transformed decachlorodiphenyl, and its recycling.

The excess of sodium hydroxide strongly reduces the secondary reactions which are promoted by a neutral or slightly alkaline medium.

The sodium hydroxide concentration in the hydrolyzing medium is not critical. It may vary within very large limits, but the applicant has found that the highest productivities were obtained when the sodium hydroxide concentration was between 6 and 10%.

By "productivity" is meant the amount of phenol produced per unit of time and per unit of reactive volume.

Temperature is a determining factor of the hydrolysis speed. The action is appreciable from 200° C., it becomes rapid towards 240° C. and its speed continues to increase with the temperature. One will work preferably between 240 and 250° C., which leads to conversions near 100%, for a duration of reaction of 2 to 4 hours.

This duration of reaction might be lowered further, for example to one hour, if one worked at 260–270° C.; but such a high temperature would cause the formation of strongly colored by-products and would impair the yields and the quality of the final product.

If the temperature is lowered below 240° C., the reaction becomes slower and slower and at 230° C. a time of contact of 8 hours becomes necessary to obtain a complete reaction.

The starting decachlorodiphenyl is a dense, finely crystallized powder. The dimension of the crystals, such as are obtained in the manufacturing process described by the applicant in his French Patent 1,229,815 of March 10, 1959, ranges from 20 to 40 microns.

These crystals disperse easily in the hydrolyzing medium and the utilization of a wetting material, with a view to improving the contact with the medium, is not necessary.

If one starts from a still finer product, of a few microns, the addition of a wetting element is advantageous, but it is not absolutely necessary and the results are not fundamentally different in one or the other case.

The product resulting from the phenolization is in the form of an aqueous solution of sodium phenate or other alkali metal phenate or alkaline-earth metal phenate, which, after filtration, is acidified with a mineral acid, for example hydrochloric acid or sulphuric acid.

The octochlorodihydroxydiphenyl separates in the form of a flocculent precipitate, which is afterwards drained, washed and dried.

Calculated in relation to the decachlorodiphenyl used, the yield, according to the process of the invention, is greater than 95%.

B. PURIFICATION

The phenol thus obtained is generally colored grey-maroon. For some applications (manufacture of plastic materials in particular), it is necessary to purify it. Several treatments are possible. The distillation under high vacuum of 0.3 to 0.5 mm. of mercury at 240–250° C. leads to a very slightly colored product, but the operation is difficult, not only on account of the high vacuum, but also because of some condensation difficulties due to the fact that the melting point and the boiling point of the product are separated only by an interval of temperature of 10° C. Moreover, although one works under vacuum of 0.3 to 0.5 mm. of mercury, diphenol presents a certain thermal instability, this resulting in a substantial loss of yield.

A treatment of the raw diphenol dissolved in an organic solvent or of the sodium phenate or other alkali metal phenate or alkaline-earth metal phenate, by adsorbing materials such as bentonite, activated alumina, silica gel, bone-black, is not very satisfactory.

Fractional precipitation from the phenate solution, which consists is acidifying to pH of about 7, separating the precipitate formed at that pH, acidifying the filtrate to pH of about 3, and separating the precipitate formed at that pH, constitutes only an insufficient partial purification.

The purification by crystallization in an organic solvent such as ethyl acetate, leads to better results, but the process is expensive.

Contrary to these processes, the purifying treatment according to the invention enables one to obtain an octochlorodihydroxydiphenyl of great purity, nearly white.

It consists essentially, as previously indicated, in treating the alkaline aqueous solution of impure octochlorodihydroxydiphenyl with a soluble salt of a heavy metal or of an alkaline-earth metal. This salt is, for example, a bivalent salt of iron, bivalent salt of copper, of manganese, nickel, cobalt, calcium, barium, strontium, magnesium.

On grounds of economy, a bivalent salt of iron is preferably utilized, for example $FeSO_4 \cdot 7H_2O$ or $FeCl_2 \cdot 4H_2O$, but other salts may be employed with the same effectiveness, such as: the chlorides, the nitrates and sulphates of copper, of manganese, of nickel, of cobalt, of calcium, of magnesium, and the chlorides and nitrates of barium and of strontium.

The process is general and may be applied whatever the method for obtaining raw octochlorodihydroxydiphenyl may be.

The amount of metal salt to be used depends on the degree of coloration of the diphenol. The applicant has obtained good results by working with molar proportions ranging from 0.2 to 0.8 mole of salt per mole of diphenol.

The addition of the metal salt to the phenate solution can be made either in the solid form, or preferably in the form of an aqueous solution. Under the action of the alkalinity of the medium a precipitate of hydroxide forms, said precipitate dragging along the phenol impurities.

The treatment is carried out rapidly; after agitation of the medium during 5 to 10 minutes, the operation is ended.

The temperature is not critical and the purifying may be carried out satisfactorily at the ambient temperature.

After separation of the precipitated metallic hydroxide, by filtration or centrifugation, the filtrate is acidified with a mineral acid, for example sulphuric acid or hydrochloric acid. The octochlorodihydroxydiphenyl precipitates; it is filtered, washed and dried. A white pulverulent product is obtained, which has a great purity and a melting point included between 230 and 240° C.

The process is simple and economical; its yield is high: 95–96%.

The following non-limitative examples illustrate the invention.

In the examples relating to the purification, the obtained results were compared by determining arbitrarily the coloration intensity of each octochlorodihydroxydiphenyl prepared and treated.

The coloration intensity was measured on a solution of 2 g. of octochlorodihydroxydiphenyl in 50 cc. of soda N, with a bicellular photocolorimeter, type U, 56 AV Electrosynthesis, equipped with an "E.S. double" filter of the manufacture, whose transmission range was below 450μ. Colorimetric tubes of 11 mm. in diameter were used and the solutions to be tested were compared with a solution of pure soda N. The product is the purer as the number indicated by the apparatus is smaller.

Example I

Into a stainless steel autoclave with a useful capacity of 3 liters, were introduced 172 g. of sodium hydroxide dissolved in 2000 cm.$^3$ of water and then there were added 430 g. of raw decachlorodiphenyl in powder of 20 to 40 microns, having a melting point of 303–304° C.

The mixture was rapidly heated to 245° C., under strong stirring, and maintained at this temperature during 3 hours. The pressure was 35 kg./cm.$^2$.

After cooling down, 10 g. of non-transformed decachlorodiphenyl were separated by filtration. The filtrate diluted to 5000 cc. was acidified with hydrochloric acid at 15% to pH 3. The phenol thus precipitated was filtered, washed with water and dried at 70° C. 380 g. of octochlorodihydroxydiphenyl, of melting point 235–238° C., were obtained. The product had a beige color. Its analysis based on the neutralization equivalent was near 100%. It gave at the colorimeter an extinction of 1.75.

The transformation of the decachlorodiphenyl was 97.7%, and the yield in phenol in relation to the transformed decachlorodiphenyl was 97.6%.

Example II

The operation was the same as in Example I, except that the phenolization temperature was 255° C. and the reaction time was 2 hours.

After cooling down, the reaction mixture was filtered and 12 g. of a brown residue were recovered.

The filtrate, after dilution to 5000 cc., was acidified to pH 3 with an aqueous solution of hydrochloric acid at 15%. 382 g. of diphenol were obtained, also of a beige color, of melting point 233–237° C., which gave at the colorimeter an extinction of 1.80.

The decachlorodiphenyl transformation was 100%; the phenol yield in relation to the transformed decachlorodiphenyl was 95.6%.

Example III

An octochlorodihydroxydiphenyl sodium solution obtained as in Example I, was divided into four equal parts of 1250 cc. each.

*Fraction No. 1.*—The diphenol was extracted according to the process described in Examples I and II. 94.5 g. of diphenol were obtained, with a phenol yield of 97.4%. It gave at the colorimeter an extinction of 1.82.

*Fraction No. 2.*—Fractional precipitation was carried out. In a first step, the solution was acidified with hydrochloric acid to pH 7. There was formation of a most colored precipitate, difficult to filter, and which represented about 4.5% of the whole phenol.

After separation of the first precipitate, the filtrate was acidified to pH 3 and there were obtained, after filtering, washing and drying at 70° C., 90 g. of diphenol which gave at the colorimeter an extinction of 1.25. The phenol yield in relation to the transformed decachlorodiphenyl was 92.5%.

*Fraction No. 3.*—The alkaline aqueous solution was agitated with 20 g. of bone-black, during one hour. After filtering, the diphenol was extracted by acidification to pH 3.

The product obtained after filtering, washing and drying at 70° C., weighed 90.5 g.; it gave at the colorimeter an extinction of 0.81. The phenol yield in relation to the transformed decachlorodiphenyl was 93%.

*Fraction No. 4.*—After addition of 8 g. of sodium hydroxide, the fraction was treated under strong stirring, with 53 g. of ferrous sulphate dissolved in 200 cc. of water; after 5 minutes of stirring, the ferrous hydroxide precipitate was filtered and the phenol in the filtrate was precipitated by acidification to pH 3. 91 g. of practically white octochlorodihydroxydiphenyl were obtained which gave at the colorimeter an extinction of 0.32. The phenol yield in relation to the transformed decachlorodiphenyl was 96.3%.

Example IV

A solution of octochlorodihydroxydiphenyl in sodium hydroxide obtained as in Example I, was divided into four equal parts of 1,250 cc. each.

*Fraction No. 1.*—The diphenol was extracted according to the process described in Examples I and II. 95 g. of diphenol were obtained with a phenol yield of 97.1%. It gave at the colorimeter an extinction of 1.95.

*Fraction No. 2.*—After addition of 8 g. of sodium hydroxide, the fraction was treated under strong stirring with 45 g. of sulphate of manganese dissolved in 200 cc. of water; after 5 minutes of stirring, the hydroxide precipitate was filtered and the phenol in the filtrate was precipitated by acidification to pH 3. 92 g. of octochlorodihydroxydiphenyl were obtained, which gave at the colorimeter an extinction of 0.65. The phenol yield in relation to the transformed decachlorodiphenyl was 93.4%.

*Fraction No. 3.*—The process was the same as in Fraction No. 2, but employing 40 g. of nitrate of magnesium. 92.5 g. of octochlorodihydroxydiphenyl were obtained, which gave at the colorimeter an extinction of 0.69. The phenol yield in relation to the transformed decachlorodiphenyl was 94.0%.

*Fraction No. 4.*—The process was the same as in Fraction No. 2, but employing 22 g. of calcium chloride. 92 g. of octochlorodihydroxydiphenyl were obtained which gave at the colorimeter an extinction of 0.78. The phenol yield in relation to the transformed decachlorodiphenyl was 93.4%.

I claim:

1. A process for preparation of octachlorodihydroxydiphenyl comprising hydrolyzing decachlorodiphenyl with an aqueous solution of a hydroxide of an alkali metal in excess of the stoichiometric amount required to react with said decachlorodiphenyl, carrying out said hydrolyzing at a temperature between 200° C. and 300° C. to form an alkaline aqueous solution of octachlorodihydroxydiphenyl filtering said solution, adding to said filtered solution of octachlorodihydroxydiphenyl a soluble bivalent salt of a metal selected from the group consisting of iron, copper, manganese, nickel, cobalt, calcium, barium, strontium, magnesium separating the metal hydroxide precipitate formed, acidifying the filtrate with a mineral acid to precipitate octachlorodihydroxydiphenyl, separating, washing and drying said octachlorodihydroxydiphenyl.

2. A process according to claim 1, wherein the hydrolyzing temperature is between 240 and 250° C.

3. A process according to claim 1, wherein the salt of metal of said group is ferrous sulphate.

References Cited by the Examiner

UNITED STATES PATENTS

| | | | |
|---|---|---|---|
| 1,952,755 | 3/1934 | Harvey | 260—620 |
| 2,449,088 | 9/1948 | Smith | 260—620 X |
| 2,644,015 | 6/1953 | Bartlett | 260—623 |

FOREIGN PATENTS

| | | |
|---|---|---|
| 1,080,565 | 4/1960 | Germany. |
| 406,319 | 2/1934 | Great Britain. |

LEON ZITVER, *Primary Examiner.*

L. A. WEINBERGER, D. M. HELFER,
*Assistant Examiners.*